United States Patent
Gawor et al.

(10) Patent No.: US 8,639,806 B2
(45) Date of Patent: Jan. 28, 2014

(54) NOTICE OF RESTORED MALFUNCTIONING LINKS

(75) Inventors: Jaroslaw Gawor, Apex, NC (US); Lin Sun, Morrisville, NC (US); Paul Franklin McMahan, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/414,923

(22) Filed: Mar. 8, 2012

(65) Prior Publication Data
US 2012/0179940 A1 Jul. 12, 2012

Related U.S. Application Data

(63) Continuation of application No. 12/764,775, filed on Apr. 21, 2010.

(51) Int. Cl.
*G06F 15/173* (2006.01)

(52) U.S. Cl.
USPC .............. 709/224; 709/203; 709/219; 714/57

(58) Field of Classification Search
USPC ............. 709/203, 217, 223–224, 219; 714/57
See application file for complete search history.

(56) References Cited

U.S. PATENT DOCUMENTS

| | | | |
|---|---|---|---|
| 5,974,445 A | 10/1999 | Pivnichny | |
| 6,091,727 A * | 7/2000 | Han et al. | 370/395.21 |
| 6,253,204 B1 * | 6/2001 | Glass et al. | 1/1 |
| 6,601,066 B1 | 7/2003 | Davis-Hall | |
| 7,290,205 B2 | 10/2007 | Moncsko et al. | |
| 7,526,678 B2 | 4/2009 | Sankaran et al. | |
| 7,689,667 B2 | 3/2010 | Lal | |
| 2001/0047404 A1 * | 11/2001 | Suda | 709/223 |
| 2003/0028817 A1 | 2/2003 | Suzuyama | |
| 2005/0278590 A1 * | 12/2005 | McLellan et al. | 714/710 |
| 2006/0101514 A1 * | 5/2006 | Milener et al. | 726/22 |
| 2006/0230050 A1 * | 10/2006 | Rehfeld et al. | 707/100 |
| 2007/0033264 A1 | 2/2007 | Edge et al. | |
| 2008/0177994 A1 * | 7/2008 | Mayer | 713/2 |
| 2008/0244428 A1 * | 10/2008 | Fain | 715/764 |
| 2008/0263193 A1 | 10/2008 | Chalemin et al. | |
| 2009/0172154 A1 | 7/2009 | Aviles Sanchez et al. | |
| 2009/0276661 A1 * | 11/2009 | Deguchi et al. | 714/18 |
| 2010/0083135 A1 * | 4/2010 | Zawacki et al. | 715/753 |
| 2011/0161475 A1 * | 6/2011 | Raghavendran et al. | 709/222 |

OTHER PUBLICATIONS http://lifehacker.com/5278752/notify-mee-sends-an-email-when-a-downed-site-is-working, (available before earliest filing date of application).

www.pricedrop.com (available before earliest filing date of application).

www.pricegrabber.com (available before earliest filing date of application).

* cited by examiner

*Primary Examiner* — Oanh Duong

(74) *Attorney, Agent, or Firm* — Grasso PLLC; Fred Grasso

(57) ABSTRACT

Embodiments include devices, systems, methods, and articles of manufacture that facilitate sending notices that a previously identified malfunctioning link or pointer has been restored or otherwise rendered useable. Embodiments can include systems with a registry wherein when a user discovers that a link is not functioning properly the registry may register the malfunctioning link, may facilitate further queries of the malfunctioning link, and may provide updates to one or more user portals that the previously malfunctioning link or pointer is no longer malfunctioning.

20 Claims, 3 Drawing Sheets

NOTICE OF RESTORED MALFUNCTIONING LINKS

BACKGROUND

The present invention relates to accessing information over a network using links or pointers. More specifically, providing notice to users when a previously malfunctioning link or pointer has restored functionality.

Clicking on a link or pointer in a web browser may result in a "file not found" (404) error or some other 4xx-level or 5xx-level error. These errors generally indicate that there is something wrong with the link or pointer. However, the errors are not in and of themselves specific as to whether the link points to an old address or whether the server, to which the link points, has something wrong at the moment that access is sought, e.g., the server is overloaded or a file being requested from the server is corrupt. In this second example, the link itself is current, but the server to which the link points is having problems serving the pages at the moment access is sought. No additional information is provided by the error message, including what is wrong with the link and when the link is anticipated to come back.

Web users may search for and find products identified for sale on the Internet and, thereafter, subscribe to price-drop notifications for these products. Changedetection.com, amazon.com, and pricedrop.com facilitate these price-drop notifications to users when a user has identified the product to be tracked. Amazon.com and pricedrop.com may deploy plug-ins for a client web-browser, where the plug-in is running on the user's local browser, in order to provide price-drop notifications. The web-browser plug-in may query websites to check the prices of previously displayed products selected by the user and, when the product's price changes, a price-update can be provided.

As will be appreciated by one of skill in the art, embodiments of the following invention are novel and nonobvious over the 4xx and 5xx level errors and the price-drop notifications described above.

BRIEF SUMMARY

Embodiments include devices, systems, methods, and articles of manufacture that facilitate sending notices that a previously identified, malfunctioning link or pointer, has been restored or otherwise rendered useable. Embodiments can include systems with a registry wherein when a user discovers that a link is not functioning properly the registry may register the malfunctioning link, may facilitate further queries of the malfunctioning link, and may provide updates to one or more user portals that the previously malfunctioning link or pointer is no longer malfunctioning.

In embodiments, an administrator may also be involved. The administrator may sets parameters upon which the queries may be conducted and the notices may be provided. The administrator may also facilitate registering the malfunctioning link with the registry and may set parameters that affect provisioning of status information including expected down time, quality of link compared to other links, previous malfunctions, etc. This status information may be shared with all the users monitoring the given link as well as to selected users and groups of users.

Notifications of the repaired malfunctioning link may be sent directly to a user portal and may be done through other methods and systems as well. The manner in which notifications may be provided may be designed by users and by the administrator. The notices can include using various communication protocols, sending notices to multiple users, using several notification methodologies for a single user, and combinations thereof.

The query schedule and format, and the notification schedule and format, may be user set or administrator set, or set by both. The query schedule and format to identify the repair of identified malfunctioning links may include periodic queries, tailored query schedules, and query schedules specific to users and links. The notification schedule and format may be specific to users, user groups, links, link types, and adjusted by other parameters as well. The notifications may be sent using SMS messages, MMS messages, e-mail, link color changes, blinking alerts, and in other ways as well.

Thus, embodiments may include robust and diverse query and notification systems, which may employ a registry, user instructions, and administrator instructions, to provide user alerts that a previously malfunctioning link has been restored.

DETAILED DESCRIPTION

Figure 1:
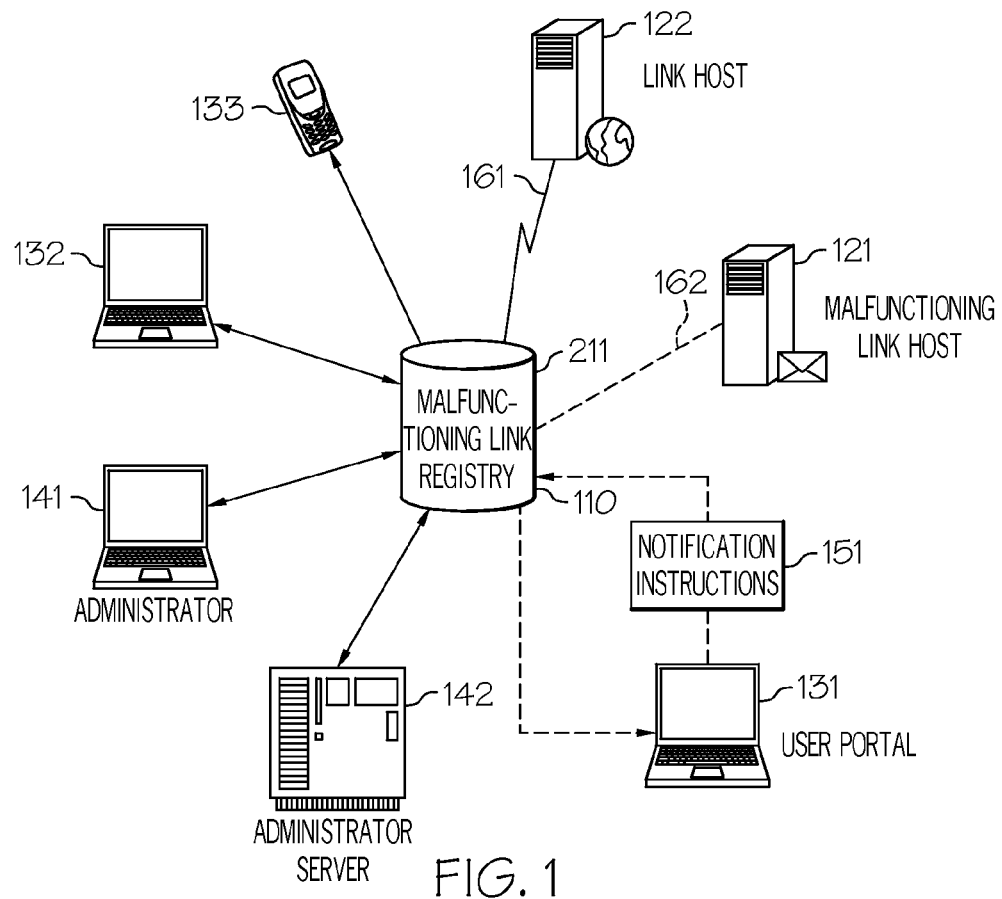
FIG. 1 shows a schematic of a system employing a malfunctioning link registry in accord with embodiments of the invention.

In embodiments, when a user receives an error message, such as a 4xx-type or 5xx-type error message, the link triggering the error message may be automatically registered with a malfunctioning link registry or Malfunctioning Link Registry Service ("MLRS"). The MLRS, which is herein used synonymously with the malfunctioning link registry also used herein, may monitor the malfunctioning link on a periodic basis and provide an update to the user when the malfunctioning link was repaired or otherwise becomes accessible. The registration of the malfunctioning link registration can be shared with multiple users such that users in a group or other class can be notified that a certain link is not currently functioning.

In embodiments, indicators may be presented on a web browser when a malfunctioning link is registered and being monitored. For example, a link may change colors on the web browser for a user and groups of users to signify that that particular link is not functioning at the moment or was not functioning properly. A color change or other notification may also be used in a web browser or other program to show users that the MLRS has registered a malfunctioning link, based on a previous attempt to access the link from a user in that community, and is monitoring the link. Likewise, bookmarks saved in a web-browser may be altered within a community of users when one user or the MLRS identifies a malfunctioning link. In so doing, multiple users in the community can be notified that a particular link is malfunctioning without having previously visited the site during the period that the link is malfunctioning. In addition, a service registry, such as an MLRS, may also store this information and provide access to users within the community of the identity of malfunctioning links, e.g. a searchable list of currently malfunctioning links. The status of malfunctioning links, and timely updates when a functioning links come back online, may be provided by the service registry as well.

In embodiments, various users within a community or an administrator can register a malfunctioning link with the service registry. This registration can serve to update users in the community or within other communities as well. An end-user may be unaware that the registry service is in place or being employed until the notifications are received and presented to the user. Similarly, a user may be unaware that the system is running in the background, having previously subscribed and set up the registry system. For example, once a user agreed to have his or her web browser communicate and sign up with the service registry, the user may be unaware that embodiments are being employed.

In embodiments, an administrator of the registry service may set up the malfunctioning notice parameters such that users may be notified or may not be notified when a malfunctioning link comes back online, becomes accessible, or is otherwise available again. The administrator may adjust and control other parameters as well, including how users are notified, when links are queried, and even affirmative searches for links, to identify them as currently malfunctioning.

FIG. 1 shows a network system in accord with embodiments. The system includes a malfunctioning link registry 110, user portals 131, 132, and 133, malfunctioning link host 121, functioning link host 122, administrator 141, and administrator server 142. As can be seen, each of these components within embodiments may communicate with each other in one or both directions, over a network or directly, and sometimes the links, may be functioning as shown at 161, or malfunctioning, as shown at 162.

As described above, when a user portal 131 seeking to access information on a link host encounters an error message that the link is not functioning properly, the user portal may directly or indirectly be involved in registering the malfunctioning link identity with the malfunctioning link registry 110. This registration process may include storing in memory, at the malfunctioning link registry 110, the identity or description of the link or pointer, sending the information to an administrative server such as 142, and/or performing other tasks as well. Once the malfunctioning link is identified, the malfunctioning link registry 110, by itself or in combination with the administrative server 142, may monitor the link and then provide subsequent notice to user portal(s) when the link comes online. This monitoring may include periodic monitoring as well as selective monitoring. Other monitoring schemes may be in use as well.

In embodiments, when the malfunctioning link 162 is found to be functioning again, the user portal 131, 132, and/or 133 may be notified by the malfunctioning link registry 110. This notification may be directed to user portals who previously identify the malfunctioning link, as well as user portals that had not previously identify the malfunctioning link 162. In other words, a user portal may receive notices of malfunctioning links even though that particular user has not encountered or otherwise identified the current malfunction of a particular link. The notifications to users may include receiving e-mails, SMS messages, browser pop-ups, changes in link colors, and other types of visual or audible tags or indicators.

In embodiments, the administrator 141 or user may set up protocols and schedules for monitoring regimes of the malfunctioning link registry 110. These protocols and schedules may include monitoring periods, monitoring related links, and methods of notification. The administrator or user may also include delays in notification and/or other types of notification requirements. The administrator or user may also set up queries to prompt users, wherein users using embodiments may themselves identify when and how a notification of a repaired producing malfunctioning link is provided. This can include when the link itself is broken, how notification should be provided, and when unavailable material within the link for example a broken file or missing file is later replaced. In this second situation a different type or special type of notification may be provided. For example, if an italicized notification was provided to show that the malfunctioning link was functioning again, when a file previously unavailable was subsequently repaired, in addition to italics, the link may also be bolded or otherwise highlighted to show the type of malfunction that was repaired.

Embodiments of the invention may include plug-ins to web browsers to facilitate communication between the web browser and the MLRS. And, as noted, once a user registers the web browser with a system registry, further instructions or actions from the user may no longer be needed.

Figure 2:
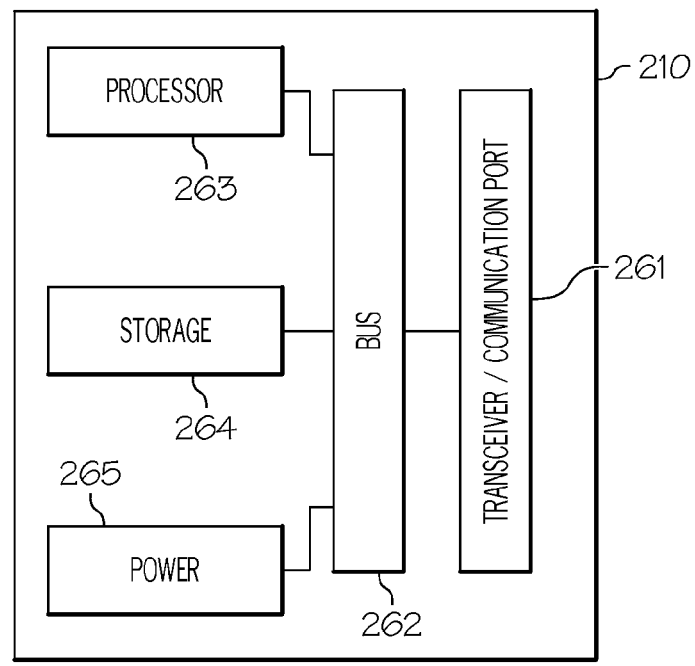
FIG. 2 shows a circuit-board schematic of a malfunctioning link registry in accord with embodiments of the invention.

FIG. 2 shows a circuit-board schematic of a malfunctioning link registry 210. The MLR 210, as shown in FIG. 2, includes a processor 263, storage 264, power 265, bus 262, and transceiver communication port 261. As can be seen in FIG. 2, the bus 262 may facilitate and allow communication to, from, and between other components in the MLR. The transceiver/communication port 261 may allow and enable the MLR to communicate over wired and wireless networks.

Figure 3:
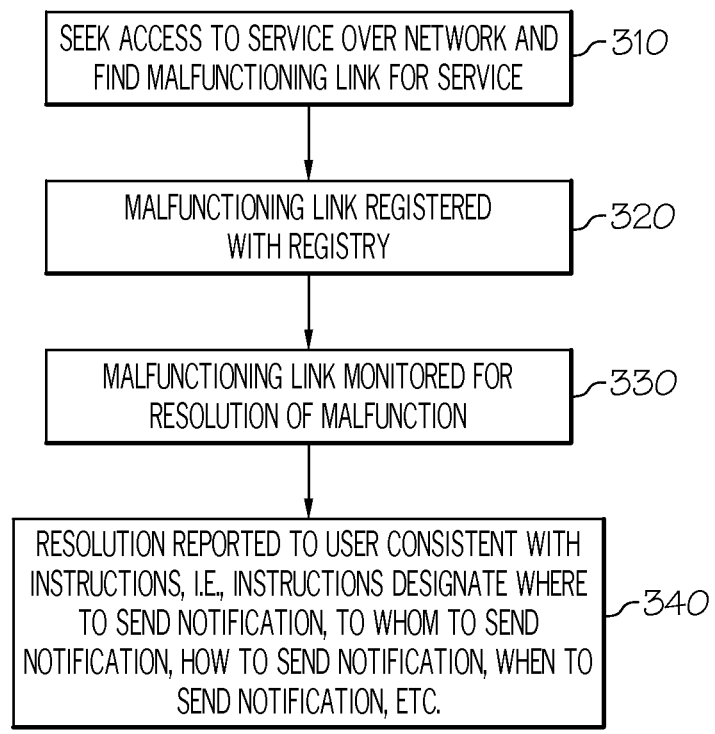
FIG. 3 shows a method as may be employed consistent with embodiments of the invention.

FIG. 3 shows actions that may be taken in accord with embodiments. These actions may include other steps or methods as well as portions of steps, methods or actions. Still further, these actions, steps or methods may be performed in other orders and in varying ways.

As shown in FIG. 3, at 310, access may be sought to a service over a network using a pointer or link. This access may identify that the link or pointer is malfunctioning. In other words, the connection to the service over the network was not successful. As shown at 320, the identified malfunctioning link may be registered with a registry, such as malfunctioning link registry service. As shown at 330, the malfunctioning link registry service may then monitor the link for resolution of the malfunction. In other words, as discussed above, periodic monitoring may be conducted by the MLRS to identify when a previously identified malfunctioning link is now properly functioning. As shown at 340, upon resolution of the previously malfunctioning link, a report may be sent to the user consistent with the instructions designated by a user or by an administrator. Other methods may also be used to designate how a user or user portal is notified. As specifically noted at 340, the instructions may designate where to send a notification, to whom to send a notification to, how to send the notification, when to send the notification, etc. Some, all, or none of these designations may be selected or used in embodiments.

Figure 4:
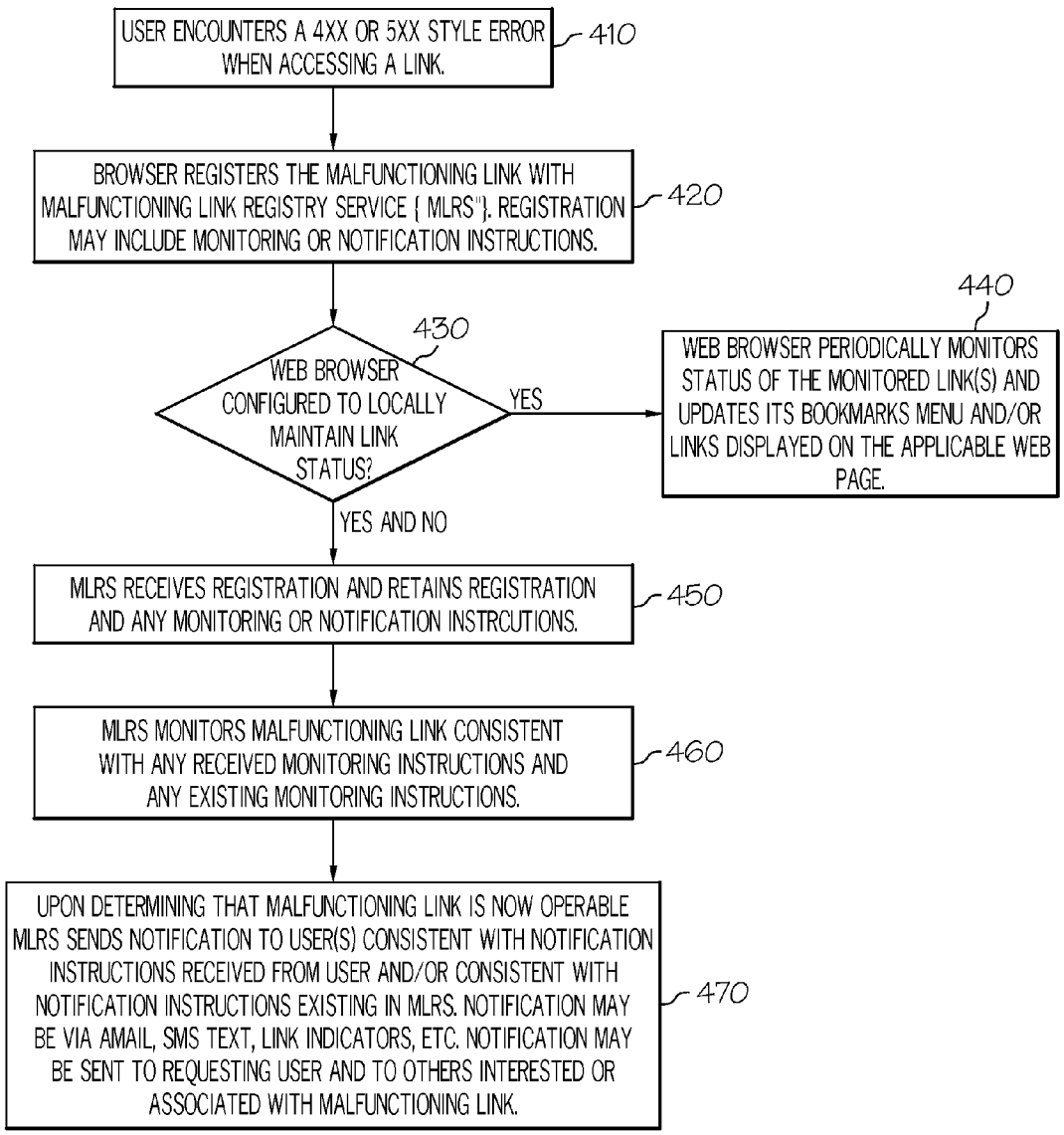
FIG. 4 shows a method as may be employed consistent with embodiments of the invention.

FIG. 4 also shows methods in accordance with embodiments. As with other methods described herein, the steps or actions shown may be included with other steps or actions, as well as be performed in various ways. As shown at 410, a user may counter a 400 or 500 style error when accessing a link. As shown at 420, upon seeing such an error, the browser of the user may register the malfunctioning link with a malfunctioning link registry service, the registration including monitoring instructions as well as notification instructions. Other instructions may be provided as well.

If the web browser of the user is also configured to locally maintain link status, as identified 430, then the web browser may periodically monitor the status of the monitored links and update its internal bookmarks menu and/or other links displayed on the applicable webpage. This additional web browser monitoring and update is shown at 440. Whether or not, a web browser is configured to locally maintain link status, as shown at 430, the multiple link registry service may receive a registration, monitoring, and notification instructions as shown at 450.

At 460, the MLRS may commence or resume monitoring the malfunctioning link with monitoring instructions received from a user portal as well as from an administrator—existing monitoring instructions previously employed by the MLRS may be used as well. At 470, upon determining that the malfunctioning link is operable, the MLRS may send notification to a user or user portals consistent with the notification instructions in place. As noted, these notifications may be via e-mail as well as SMS text, and link indicators. Also, the notifications may be sent to users in certain groups or categories as well as users identify through other methods. This may include notifying users who wish to track links identified by other users as well as users with common attributes. For example every user working on a certain project may wish to be notified when a link becomes active again in order to have access to the information on that link. Also, users working on or having certain common attributes may wish to be notified when new information is provided.

In embodiments, and by way of example, a user may be surfing the web, using a web browser, and may come across a broken link. Upon being confronted with the broken link, the user may be prompted to install a plug-in which takes advantage of the invention. Upon installing the plug-in, the user may be prompted for times in which the user can be notified of the repair of the malfunctioning link. Once the plug-in and/or other steps are taken, the user may have no further involvement with the notification process. Sometime in the future, when the malfunctioning link is identified as being repaired, the user may receive any e-mail or other type of notification, such as SMS text, that the particular link is no longer malfunctioning.

In embodiments, the registry may contain information such as the identity of the link and its status. The time that the link was last tried to be accessed and the future access pattern may be retained at the MLRS as well. Once a link becomes accessible again, and is found to be accessible, the registry may prompt a notice being sent to users as an update regarding the change status of the malfunctioning link As noted, the timing of the notification and the period between scans by the registry, may be controlled by an administrator of the system. An advantage of using the registry may be that a status is provided as an update to user rather than the content itself, which can take additional bandwidth and processing power to process. Other advantages of embodiments may also include that the registry need not provide updates across the entire user base and that the service registry need not necessarily parse content of the link.

In embodiments and as noted, administrators may interact with the service registry searches, managing recurring events, facilitating storage and backup of the registry, and other things as well. The registry may also need to recycled periodically, with the administrator setting up instructions and commands for this recycling.

Malfunction, as used herein, indicates that the link or pointer to the servers is no longer pointing properly. Malfunction may also mean that once a server is reached, the specific file to which the link is pointing, is no longer available, is corrupt, or is otherwise inaccessible.

Temporarily inaccessible as used herein mean that the link is broken but that it is expected, sometime in the future, to be up and available again. The expectation as to when the link will come back on, may be known or may be unknown.

Immediate notification as used herein means that a notification or e-mail notification or SMS text notification is sent subsequent to when the repair is identified. The notification may continue for some period time after being identified. This duration may be or may not be based on the user's instructions and/or on the administrator's instructions.

The service registry may be a server accessible over a wide area network such as the World Wide Web or the Internet. The registry may be accessible over the Internet such that users in a community can register the broken links with the registry and such that these broken links, which are registered, may be accessible by other users in the community as well.

In an example, if user A registered "http://foo" link with the service, and user B happens to be viewing a page with this link on it, the web browser could mark this link with a change of color or blinking to indicate that this link is currently inaccessible and is being monitored. Similarly, if user B has a bookmark to this link, the web browser could indicate somehow that this bookmark is currently inaccessible, because the fact that the "http://foo" link is registered as inaccessible by other users (user A here in the example). The system administrators of the web site can also register the site's information (such as anticipated down time, live time, etc.) with the service registry.

Browsers can also share that information from the service registry with the user whenever the user hits a 4xx or 5xx error. System administrators of the web site can also register to be notified of any events related to the sites they own in the service registry. For example, the administrator of site http://foo would be notified whenever user A encounters a 4xx or 5xx error when accessing the "http://foo" link This should help the administrator fix the problems in a timely fashion and to provide an anticipated live time repair to the service registry.

Most of the interaction with the service in embodiments may happen through a web browser. When a user runs into a 4xx or 5xx error the, web browser may ask a user if he or she wants to register the link with the service registry, how he or she wants to be notified, and for how long to monitor the link. The web browser could also periodically check for status of the monitored links and update its bookmarks menu or update the links displayed on the current web page.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof.

Embodiments may be implemented as a computer process, a computing system or as an article of manufacture such as a computer program product of computer readable media. The computer program product may be a computer-storage medium readable by a computer system and encoding a computer program instructions for executing a computer process.

The corresponding structures, material, acts, and equivalents of all means or steps plus function elements in the claims below are intended to include any structure, material or act for performing the function in combination with other claimed elements are specifically claimed. The description of the present invention has been presented for purposes of illustration and description, but is not intended to be exhaustive or limited to the invention in the form disclosed. Many modifications and variations will be apparent to those of ordinary skill without departing from the scope and spirit of the invention. The embodiment was chosen and described in order to best explain the principles of the invention and the practical application, and to enable others of ordinary skill in the art to understand the invention for embodiments with various modifications as are suited to the particular use contemplated.

What is claimed is:

1. A method comprising:
receiving a registration at a malfunctioning link registry service, the registration sent over a network from a first user portal to the malfunctioning link registry service, the registration identifying a malfunctioning network link;
after receiving the registration of the identified malfunctioning link at the malfunctioning link registry service and before determining that the link has been restored, the malfunctioning link registry service sending a first notification of the identified malfunctioning network link to a second user portal and a third user portal, the second user portal and the third user portal having previously identified themselves as interested in tracking the link identified to the malfunctioning link registry service by the first user portal;
after receiving the registration of the identified malfunctioning link at the malfunctioning link registry service sending to the first user portal, a second notification, the second notification from the malfunctioning link registry service and providing that a previously identified malfunctioning network link has been restored;
the second notification received by the first user portal being sent over the network from the malfunctioning link registry service;
the malfunctioning link registry service sending the second notification after conducting a query that identifies that the previously identified malfunctioning link has been restored;
and
sending the second notification such that upon receiving the second notification at the first user portal, an indicator is updated to reflect that the previously identified malfunctioning link has been restored.

2. The method of claim 1 further comprising:
sending a notification from the malfunctioning link registry service to a fourth user portal that the malfunctioning link identified in the previously received registration from a first user portal has been restored, the fourth user portal being unaware of the malfunctioning link until receipt of the notification from the malfunctioning link registry service that the malfunctioning link identified by the first user portal has been restored.

3. The method of claim 1 further comprising:
periodically monitoring, at a web browser at the first user portal, a status of the previously registered malfunctioning link, the address of the link having been previously registered at the malfunctioning link registration service by the first user portal sending the registration to the malfunctioning link registration service.

4. The method of claim 1 further comprising:
sending a notification from the malfunctioning link registry to a fourth user portal, the fourth user portal identified in the registration from the first user portal as being an email address or an SMS text message address.

5. The method of claim 1 further comprising:
updating bookmarks in a web browser of a fifth user portal and a sixth user portal,
where the malfunctioning link identified by the registration sent from the first user portal to the malfunctioning link web service were already present as one or more bookmarks in the web browser of the fifth user portal and the sixth user portal,
where the bookmarks are updated in the web browser of the fifth user portal and the sixth user portal to reflect that the malfunctioning link identified by the registration sent from the first user portal to the malfunctioning link web service is not currently functioning.

6. The method of claim 1 further comprising:
sending instructions over the network to the malfunctioning link registry service, the instructions including parameters as to when to query a status of malfunctioning links.

7. The method of claim 1 further comprising:
sending instructions over the network to the malfunctioning link registry service, the instructions including parameters as to the duration for which status queries of a malfunctioning link should continue.

8. The method of claim 1 further comprising:
sending instructions over the network to the malfunctioning link registry service, the instructions including parameters to identify user portals targeted to receive notifications that a malfunctioning link has been restored.

9. The method of claim 1 wherein the second notification is sent to user portals other than the first user portal when these other user portals are selected as having attributes common with the first user portal.

10. The method of claim 9 wherein the user portals other than the first user portal have previously indicated, prior to the link malfunctioning, that they are to be notified of the status of the link identified as malfunctioning.

11. The method of claim 1 further comprising:
sending instructions to the malfunctioning link registry, from a malfunctioning link registry service administrator, that a user or group of users are not to be notified when a malfunctioning link comes back online.

12. The method of claim 1 further comprising:
sending a notification from the malfunctioning link registry service to a another user portal that a malfunctioning network link identified by the first user portal has not been restored, the another user portal being unaware of the malfunctioning link until receipt of the notification from the malfunctioning link registry that the malfunctioning link identified by the first user portal has not been restored.

13. The method of claim 1 further comprising:
concurrently monitoring, at a web browser at the first user portal, the status of the malfunctioning link while the status of the malfunctioning link is also being monitored by the malfunctioning link registry service.

14. The method of claim 13 further comprising:
updating bookmarks of the web browser to reflect the current status of malfunctioning links being monitored by the web browser.

15. A method comprising:
using a world wide web browser resident at a first user to send a registration of a malfunctioning link to a malfunctioning link registry service;
at the web browser of the first user, periodically monitoring the status of the malfunctioning link previously registered with the malfunctioning link registry service by the web browser;
at the web browser of the first user, after sending the registration to the malfunctioning link registry service, periodically checking on the status of the registered malfunctioning link and periodically updating indicators, the indicators comprising bookmarks or displayed web page links; and at the malfunctioning link registry service, while the web browser of the first user periodically monitors the status of the malfunctioning link, monitoring the malfunctioning link consistent with notification instructions received from the web browser of the first user.

16. The method of claim 15 wherein the notification instructions from the web browser of the first user include instructions to provide notification of a restored previously identified malfunctioning link at least by email or SMS text.

17. The method of claim 15 further comprising:
receiving, at the malfunctioning link registry service, identifications of users interested in receiving an updated status from the malfunctioning link registry service when the malfunctioning link identified by the first web browser has been restored.

18. The method of claim 15 further comprising:
upon determining that the registered malfunctioning link is now operational, sending a notification from the malfunctioning link registry service consistent with the received notification instructions.

19. The method of claim 18 wherein the notification is also sent to users other than the first user, these other users having previously expressed an interest in the malfunctioning link.

20. The method of claim 18 wherein the notification is also sent to users other than the first user, these other users having previously expressed an interest in links associated with the first user.

* * * * *